H. HEUSER.
PROCESS FOR BREWING BEER.
APPLICATION FILED AUG. 2, 1915.
1,302,549.
Patented May 6, 1919.
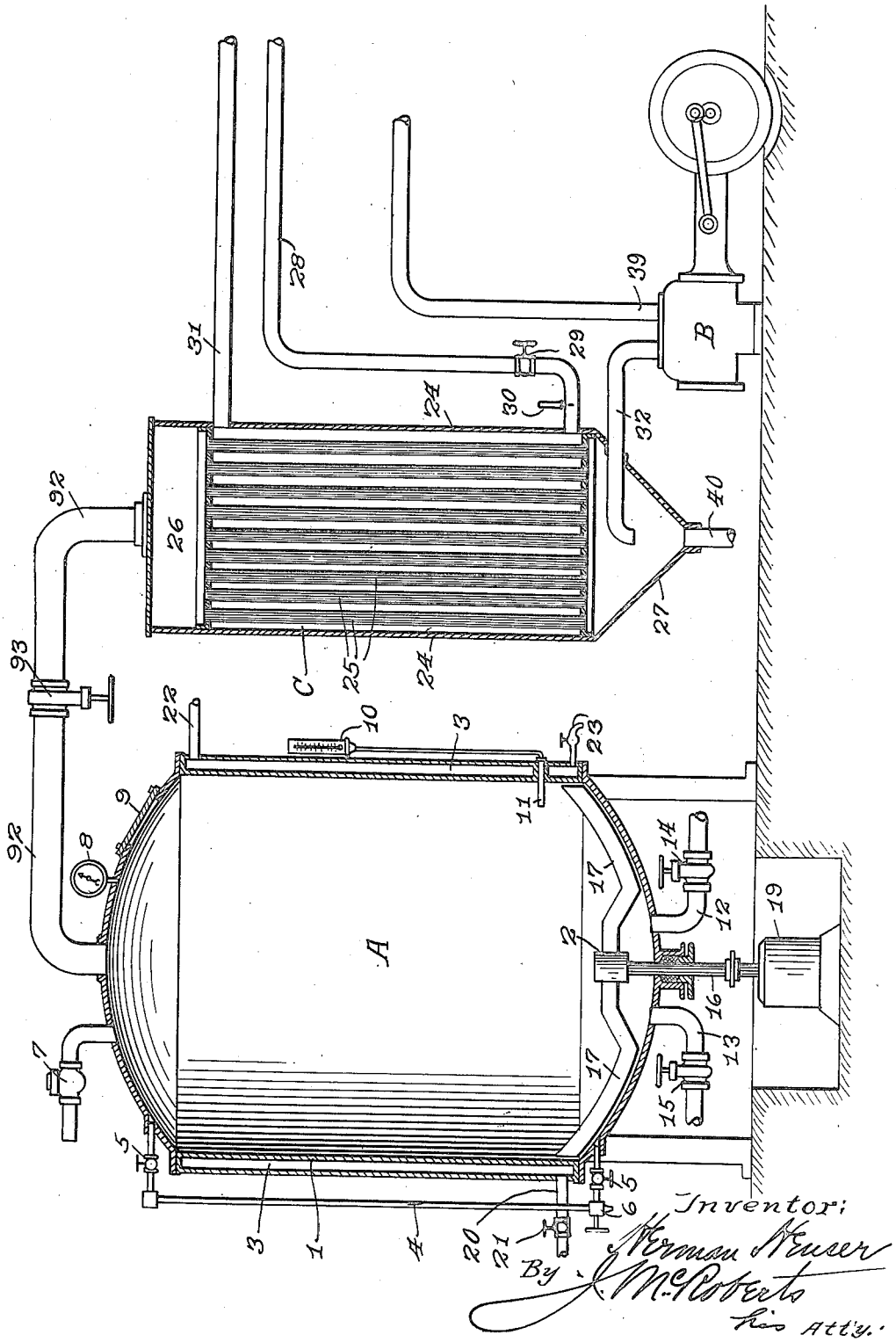
Inventor:
Herman Heuser
By J. M. Roberts
his Att'y.

UNITED STATES PATENT OFFICE.

HERMAN HEUSER, OF CHICAGO, ILLINOIS.

PROCESS FOR BREWING BEER.

1,302,549. Specification of Letters Patent. Patented May 6, 1919.

Application filed August 2, 1915. Serial No. 43,067.

*To all whom it may concern:*

Be it known that I, HERMAN HEUSER, a citizen of the United States, residing at Chicago, in the county of Cook and State of Illinois, have invented certain new and useful Improvements in Processes for Brewing Beers, of which the following is a specification, reference being had therein to the accompanying drawing.

My invention relates to the manufacture of non-alcoholic beer, of beer containing less than one-half of one per cent. of alcohol, and of temperance beer. In the processes heretofore employed for making such beverages, the de-alcoholizing occurs by distillation of the alcohol after the liquid is fermented or the beer brewed. These old processess involve certain disadvantages which are obviated by my invention, which, generally speaking, consists in simultaneously boiling and fermenting the beer wort in a vacuum and within the range of beer fermentation temperatures at which the activity of the yeast is not destroyed to evaporate the alcohol and preserve live yeast in the beverage.

In the accompanying drawing I show more or less diagrammatically and mostly in sectional view all the apparatus required to carry out my new process.

In the drawings A represents a closed cylindrical fermenting tank or apparatus consisting of a shell 1 having a rounded bottom, a stirring device 2, and a water jacket 3 surrounding its cylindrical part. The tank is provided with the usual liquid gage 4 having the valves 5 and spigot 6, and with an air or relief valve 7, vacuum gage 8, manhole 9 and a recording thermometer 10 whose socket 11 enters the fermenting chamber. At the bottom of the tank pipes 12 and 13 equipped with valves 14 and 15 respectively enter the fermenting chamber at its lowest point, the pipe 13 being connected to a source of sterilized water supply, and the pipe 12 being the outlet of the chamber through which the beer and yeast are discharged to any suitable containers. The stirrer comprises a shaft 16 and stirring plates or wings 17 so bent that when in motion they scrape to the center of the curved bottom of the chamber the yeast settled thereon; the shaft passes through a stuffing-box 18 and is suitably driven by a motor 19. The water jacket 3 is provided with a water supply pipe 20 having a valve 21, and with an outlet pipe 22 and a drain-cock 23.

B represents a vacuum pump for dry systems of any suitable design having a suction pipe 32, while its discharge pipe 39 leads either to a collecting plant or into the atmosphere. In practice, in order to condense and recover the alcohol, the pump is connected to the fermenter through an intermediate condenser, for which purpose the suction pipe 32 extends into the interior of a cone-shaped cylindrical condenser C which is connected by pipe 92 having a valve 93 to the fermenter A. The condenser here shown consists of the body or drum 24 through which the condensing tubes 25 pass from a top chamber 26 to a cone-shaped lower chamber 27, the drum being provided at its lowest point with a supply pipe 28 having a valve 29 and thermometer 30 and leading from the source of cold brine supply, and at its highest point with a pipe 31 leading back to the source of cold brine supply. The collecting chamber 27 of the condenser has a discharge pipe 40 leading the condensed alcohol to a suitable collecting vessel (not shown), the pipe being closed against suction through it by the pump B by any suitable seal or overflow device.

The fermenting chamber is filled with beer wort to a suitable height leaving sufficient space for the formation of foam, the valves 5 and 7 being open and the valves 14, 15, 29 and 93 closed. The wort may be made from any material and by any process practised in the art of brewing. The yeast is added through the manhole 9, preferably when the wort first commences to flow into the fermenting chamber, the manhole then being tightly closed. The valve 7 is closed when the proper amount of wort has entered the chamber, its volume being noted on the liquid gage 4, and its temperature on the recording thermometer 10. The temperature should be such that the yeast action is not retarded, preferably between 48° and 55° Fahrenheit and usually at 52° Fahrenheit for ordinary beer, and below 80° Fahrenheit for beers on the order of ale, porter and stout.

When the first sign of fermentation is shown by samples taken at the spigot 6, valves 29 and 93 are opened, and the cold brine having a suitable temperature, preferably about 34° Fahrenheit, circulates between the condensing pipes, and the vacuum pump is now put in operation. When the gage 8 indicates a vacuum of 29.6 inches in the fermenting chamber, the wort is boiling, because 52° Fahrenheit, the preferred temperature of the wort, is the boiling point for ordinarily strong wort when it is under this vacuum. A vacuum or reduced air pressure of 29.6 inches corresponds to a pressure of .4 inch of mercury, being a vacuum expressed in inches of mercury referred to a 30 inch barometer pressure. The vapors arising from the boiling and fermenting wort consist not only of water and $CO_2$ but also of alcohol, and they pass through pipe 92 into the condenser. The $CO_2$ developed is drawn into the vacuum pump and discharged by its pipe 39 into a collecting system. The other vapors, including the alcoholic vapor, are condensed in the pipes 25 and drop as liquid into the cone-shaped chamber 27 from whence the liquid passes into suitable receptacles at intervals through the pipe 40 when the seal of the latter is broken. The condensed vapors thus collected during fermentation consist of the water and alcohol formed during fermentation.

The heat developed during fermentation by the decomposition of the fermentable carbohydrates into alcohol and $CO_2$ is not sufficient to keep up the original temperature of the wort, because the latent heat consumed by the evaporation of the water and alcohol is very large in comparison to the heat produced by fermentation. In order to keep the wort at its original temperature, valve 21 is opened, and water of about 70° Fahrenheit flows through pipe 20 into the water jacket 3 and rising in the jacket around the tank is discharged through pipe 22. The waterflow through jacket 3 is regulated by valve 21 from the readings of the recording thermometer 10. Simultaneously the stirrer 2 is put in motion for the purpose of uniformly distributing the heat from the jacketed walls of the fermenting tank through the entire liquid content, the stirrer turning slowly around, just sufficient to make the heat exchange uniform. It is not essential to use a stirrer, but its operation makes certain that all parts of the wort have at all times the same temperature, and as it effectually breaks up and disperses the vapor bubbles rapidly rising up through the liquid, it also materially limits the formation of foam, which is desirable, as foam formation during fermentation is troublesome and detrimental. Mechanical agitation by stirring also is preferable during the stage of raising the vacuum to the desired point, as when the process is initiated or when it is resumed after the vacuum is broken for any reason; the difference in temperatures of the heating medium and the liquid to be heated necessarily is high on account of the large quantity of heat required for evaporation, and at such stage the liquid under treatment is apt to be overheated and injured at its contact with the heating surface because it lacks even the agitation due to boiling as during this stage boiling is either absent, or is very incomplete and irregular, being continually arrested and started again, until the liquid boils steadily. In the case of low-fermentation or ordinary beer this injury to the wort caused by the relatively high temperature of the heating medium consists in a disagreeable yeast taste and flavor which render the beer unfit to drink, and in the case of high-fermentation beer, such as ale, porter and stout, this injury to the wort caused by the relatively high temperature of the heating medium, which is then between 100° and 125° Fahrenheit, consists not only in the disagreeable taste and flavor of the beer product but extends also to the yeast itself. During the boiling of the wort it is necessary to maintain its original level in the tank, and for this purpose valve 15 is opened and sterilized clear water of suitable temperature, preferably 52° Fahrenheit, passes through the pipe 13 into the fermenting chamber, the flow of such water being regulated by valve 15 from the readings on the liquid gage 4.

When the fermentation has been completed the stirrer and vacuum pump are stopped, and valves 15, 21 and 93 are closed, and valve 7 is opened, the drain valve 23 of the water jacket 3 also being opened to drain the water therefrom. The fermented wort or beer is then cooled in any suitable way, preferably to a low temperature, say 36° Fahrenheit, the yeast settling on the bottom of the tank, and when the beer has been cooled the valve 14 is opened to allow the beer to flow through pipe 12 into a storage tank (not shown) for such further treatment as may be desired. The yeast settlement on the bottom of the fermenting tank is removed by turning the stirrer 2, which pushes the yeast to the center of the curved bottom from where it passes through pipe 12 into a suitable storage vessel (not shown).

By my invention the fermentation of the wort or brewing of the beer is completed in a much shorter time than otherwise is the case, because the $CO_2$ and the alcohol, which have a retarding influence on the fermenting action of the yeast, are removed during their formation. Hence worts of unusually high concentration can be fermented by my process without running the risk of either retarding or stopping fermentation by too high a concentration of alcohol. Also, by fermenting the wort in a vacuum sufficiently high to enable me to keep the fermenting and boiling temperature at a point where the action of the yeast is not retarded, the yeast remains in a sound and vigorous condition and the beer retains the beery flavor due to the hops, malt and yeast. It is well known that the action of the yeast is retarded at about 90° Fahrenheit in the fermenting tank, and that it is "killed" above such temperature. In the practice of my invention I do not approach a retarding temperature; the temperature of the wort is always so far below the temperature at which yeast action is retarded or killed that even with the rise in temperature in the wort due to the chemical heat developed by the breaking up of its fermentable matter it does not reach a retarding temperature and the highest temperature even for high-fermentation beer is safely below the danger point.

Although in practical application I prefer to employ my invention for the production of non-alcoholic beer, I may employ it for the production of temperance beer and beer containing less than one-half of one per cent. of alcohol. For the production of these beers with a reduced content of alcohol, the above combined fermentation and boiling for alcohol evaporation proceed to the point where the fermentable carbohydrate part of the wort is about double the amount of alcohol by weight desired in the final product. At this point the simultaneous fermentation and boiling with the resulting evaporation of the alcohol are stopped, as by closing the valve 93, and fermentation is continued at ordinary atmospheric pressure, as by opening valve 7. It is assumed that each pound of carbohydrate yields one-half pound of alcohol by fermentation; this is not scientifically correct but it is sufficiently correct for practical purposes. For instance, for the production of a beer that is to contain about 1.50% of alcohol by weight, the combined fermentation and evaporation are stopped when the fermenting wort contains about 3% of fermentable carbohydrates, and fermentation is continued at ordinary atmospheric pressure to the end; if the beer is to contain about 0.40% of alcohol by weight, the combined fermentation and boiling are stopped and fermentation under atmospheric pressure continues when the wort contains about 0.80% of fermentable carbohydrates.

Beer de-alcoholized during its fermentation possesses the characteristics of a first class real beer, it is like beer in appearance and foam-stability, and its taste and flavor as derived from malt, hops and yeast are preserved.

Where the collection of alcohol is not desired my process may be carried out by an apparatus omitting the alcohol condenser, in which case the fermenter will be directly connected to the vacuum pump which then discharges the alcohol vapor along with the $CO_2$ through its outlet 39, this pump in either apparatus serving also as the means to remove the vapors from the tank.

I claim:—

1. In the manufacture of beer, the process which consists of simultaneously boiling and fermenting the wort under reduced air pressure within the range of beer fermentation temperatures to preserve live yeast in the beverage.

2. In the manufacture of beer, the process which consists in simultaneously boiling and fermenting the wort in a vacuum and at a temperature suitable to preserve the yeast in its active condition or state for beer fermentation.

3. In the manufacture of beer, the process which consists in simultaneously boiling and fermenting the wort in a vacuum and at a temperature between 48° and 55° Fahrenheit.

4. In the manufacture of beer, the process which consists in simultaneously fermenting and boiling the wort in a vacuum and at yeast fermentation temperature, and in mechanically agitating the wort.

5. In the manufacture of beer, the process which consists of simultaneously boiling and fermenting the wort under reduced air pressure within the range of beer fermentation temperatures, and in mechanically agitating the wort during the raising of the vacuum to the desired point.

6. In the manufacture of alcohol-reduced beer, the process which consists in simultaneously boiling and fermenting the wort in a vacuum and at yeast fermentation temperature to preserve live yeast in the beverage, stopping the combined fermentation and boiling of the wort when it contains a predetermined amount of fermentable elements, and then completing the fermentation of the wort at atmospheric pressure.

7. In the manufacture of alcohol-reduced beer, the process which consists in simultaneously boiling and fermenting the wort in a vacuum and at yeast fermentation temperature to preserve live yeast in the beverage, mechanically agitating the wort, stopping the combined fermentation and boiling of the wort when it contains a predetermined amount of fermentable elements, and then completing the fermentation of the wort at atmospheric pressure.

In testimony whereof I affix my signature in presence of two witnesses.

HERMAN HEUSER.

Witnesses:
   EDITH WILCOX,
   J. McROBERTS.